United States Patent
Kurita

(10) Patent No.: US 6,932,205 B2
(45) Date of Patent: Aug. 23, 2005

(54) CLUTCH

(75) Inventor: Masahiro Kurita, Mie-ken (JP)

(73) Assignee: NTN Corporation, Osaka (JP)

( * ) Notice: Subject to any disclaimer, the term of this patent is extended or adjusted under 35 U.S.C. 154(b) by 12 days.

(21) Appl. No.: 10/677,739

(22) Filed: Oct. 3, 2003

(65) Prior Publication Data

US 2004/0129524 A1 Jul. 8, 2004

(30) Foreign Application Priority Data

Oct. 16, 2002 (JP) .................................... 2002-302058

(51) Int. Cl.⁷ ............................................. F16D 15/00
(52) U.S. Cl. ........................................ 192/44; 192/93 A
(58) Field of Search ............................. 192/44, 43, 45, 192/54.5, 66.2, 93 A, 48.92

(56) References Cited

U.S. PATENT DOCUMENTS

| | | | | |
|---|---|---|---|---|
| 6,135,255 A | * | 10/2000 | Myers | 192/45 |
| 6,446,776 B1 | * | 9/2002 | Kerr | 192/44 |
| 6,550,594 B1 | * | 4/2003 | Peura | 192/44 |
| 6,684,992 B2 | * | 2/2004 | Goto et al. | 192/35 |

FOREIGN PATENT DOCUMENTS

| | | |
|---|---|---|
| EP | 0 355 306 | 2/1990 |
| EP | 1 101 967 A1 | 5/2001 |
| JP | 2001-140926 | 5/2001 |

* cited by examiner

Primary Examiner—Saul Rodriguez
(74) Attorney, Agent, or Firm—Arent Fox, PLLC

(57) ABSTRACT

A clutch, which is applicable to the applications where an electromagnetic clutch is conventionally used, is provided in order to realize the reduction of the clutch in size, weight and cost and the power saving of the clutch. A clutch according to the present invention includes: an input gear to which a rotational torque is input; a clutch member attached to an inner circumferential face of the input gear; a tapered roller acting as an engaging element; a retainer for holding the tapered roller; a cap member; a waved spring; an output shaft serving as a driven member; a housing for sheathing the input gear; a working member equipped with an operating lever; and a return spring serving as an elastic return member, for elastically supporting the working member. With a simple operation of pivoting the operating lever of the working member, the clutch can be easily switched between a state where the tapered roller is engaged in a wedgewise manner so as to drive and rotate the output shaft and a state where the wedge engagement of the tapered roller is cancelled to freely rotate the output shaft.

9 Claims, 8 Drawing Sheets

CLUTCH

BACKGROUND OF THE INVENTION

1. Field of the Invention

The present invention relates to a clutch including an engaging element enabling the wedge engagement in the circumferential direction between an input member to which a rotational torque is input and a driven member. An operation state of the clutch is switchable between a state where the rotational torque is transmitted from the input member to the driven member and a state where the driven member freely rotates with respect to the input member. Such a clutch is applicable to, for example, a mechanism for switching an electrically-operated sliding door between an automatic opening/closing state and a manual opening/closing state.

2. Description of the Related Art

Conventionally, in an electrically-operated sliding door, the input of a rotational torque from a motor (driving device) drives a driving mechanism for a door in a forward/reverse rotation direction to open/close the door. In the case where the sliding door is to be manually opened/closed when a power switch is OFF or during a blackout, the door is too heavy to manually open/close because a rotor of the motor rotates along with the door movement. In order to overcome this inconvenience, there conventionally exists an electrically-operated sliding door including an electromagnetic clutch between a sliding door and a motor. When the electromagnetic clutch is turned OFF with the electromagnetic clutch being interposed between the sliding door and the motor, the door can be manually opened/closed with a small force because the connection between the door and the motor is cancelled. Moreover, such a sliding door is convenient because the sliding door is automatically switched to a manual opening/closing state in the case of emergency such as a blackout.

On the other hand, for a reclining seat, the inventors of the present invention have proposed a clutch for switching a seat back between a locked state and a free state by the operation of a lever, as a mechanism capable of adjusting the angle of the seat back in a stepless manner. In this clutch, an engaging element housing space is formed, which is gradually enlarged from one narrow side toward the opposite side in the axial direction between an inner ring connected to an operating lever and an outer ring connected to the seat back. In this engaging element housing space, the clutch includes an engaging element (tapered roller) that is engaged in the circumferential direction. The clutch operates to move the engaging element to the narrower side or the larger side of the engaging element housing space that is gradually enlarged in the axial direction so as to switch the seat back between the locked state and the free state (see Japanese Patent Laid-Open Publication No. 2001-140926, called as "Patent Reference 1" hereinafter).

Since the above-described electromagnetic clutch utilizes a frictional force obtained by (contact load due to electromagnetic force x friction coefficient), the electromagnetic clutch is increased in its size as well as in its mass in order to transmit a rotational torque without causing any slip. Therefore, in many cases, the electromagnetic clutch cannot meet the requirements of reduction in size and weight as well as in cost. Moreover, since the electromagnetic clutch is required to be always electrically conducted so as to maintain a torque transmission state, the electromagnetic clutch is disadvantage in its increased running cost.

On the other hand, the clutch, which has been proposed by the inventors of the present invention in the Patent Reference 1 regarding the reclining seat, has the function of switching the driven member between the locked state and the free state. However, the clutch disclosed in the Patent Reference 1 has been proposed supposing its application to the use where a large torque acts, such as to a reclining seat. On the contrary, in order to use this clutch for the electrically-operated sliding door, it is required to ensure sufficient rigidity of such a clutch to be used in a site that is subjected to a small rotational torque. At the same time, its fabrication cost is needed to be reduced. In order to solve these problems, various modifications should be further effected.

SUMMARY OF THE INVENTION

The present invention has an object of applying a clutch previously proposed by the inventors of the present invention for a reclining seat of a vehicle or the like to the applications where an electromagnetic clutch is conventionally used so as to realize the reduction of the clutch in size and weight as well as in cost and the power saving.

A clutch according to the present invention includes: an input member to which a rotational torque is input; a driven member which is driven to rotate in response to the rotational torque transmitted from the input member; and an engaging element enabling wedge engagement in the circumferential direction between the input member and the driven member, the engaging element being provided in an engaging element housing space formed between the input member and the driven member, wherein the rotational torque is transmitted from the input member to the driven member when the engaging element is engaged in a wedge-wise manner in the circumferential direction between the input member and the driven member, and an engagement portion where the engaging element enables the wedge engagement is provided on one side of the engaging element housing space in the axial direction, whereas a disengagement portion where the wedge engagement of the engaging element is cancelled is provided on the opposite side, and operation means for moving the engaging element in the axial direction between the engagement portion and the disengagement portion is provided.

In this clutch, the driven member is driven to rotate when the engaging element is moved to the engagement portion of the engaging element housing space by the operation means, whereas the driven member freely rotates when the engaging element is moved to the disengagement portion of the engaging element housing space. This clutch can be reduced in size and weight as well as in cost as compared with an electromagnetic clutch. Moreover, since the clutch is not required to be always electrically conducted, this clutch is also advantageous in terms of power saving.

In the clutch according to the present invention, the engaging element is a tapered roller, and a retainer for holding the tapered roller is provided between the input member and the driven member so as to be movable in the axial direction. The engaging element housing space is formed between the input member and the driven member so as to be narrowed on one side in the axial direction and to be gradually enlarged toward the opposite side, and the engagement portion where the tapered roller is engageable in the circumferential direction is provided on the narrower side of the engaging element housing space whereas the disengagement portion where the wedge engagement of the tapered roller is cancelled is provided on the larger side.

Further, the tapered roller is provided so that a minor diameter end of the tapered roller is oriented to the narrower side of the engaging element housing space while the operation means moves the tapered roller forward and backward in the axial direction along with the retainer.

In this case, a notch for allowing the elastic deformation of the retainer in the circumferential direction may be formed on one end of the retainer. With this structure, when the input rotational torque is to be transmitted or when the retainer is relatively moved in the axial direction, an internal stress generated in the retainer can be alleviated to prevent the retainer from being damaged.

Moreover, a clutch member engaged with any one of the input member and the driven member in the circumferential direction may be provided, and a cam face, with which the tapered roller is engaged in a wedgewise manner in the circumferential direction, may be provided for the clutch member. By thus providing the clutch member having an irregular-shaped cam face with which the tapered roller is engaged in a wedgewise manner as an independent member, the fabrication such as the formation of the cam face can be facilitated so as to reduce the cost.

Moreover, a guiding portion for guiding the retainer in the axial direction may be provided for the clutch member. With this structure, the retainer can be moved straight in the axial direction, thereby inhibiting the skew of the tapered roller and the like. As a result, an unexpected load can be prevented from being applied to the retainer.

Furthermore, the operation means can be constituted by: elastic energizing means for energizing the tapered roller toward the narrower side of the engaging element housing space along with the retainer; and disengaging means for moving the tapered roller toward the larger side of the engaging element housing space along with the retainer against the elastic energizing means so as to cancel the wedge engagement state of the tapered roller.

In this case, the elastic energizing means can be constituted, on the larger side of the engaging element housing space, by a spring member inserted between an inwardly-oriented or outwardly-operated flange provided for any one of the input member and the driven member and one end of the retainer. As the spring member, for example, a waved spring having a waved cross section is inserted so as to obtain the ensured pressing energizing function. In addition, the size can be compact with the use of the waved spring.

The disengaging means of the clutch according to the present invention, can be constituted by: a working member having a pressing portion provided so as to be opposed to a peripheral edge portion of the retainer on a minor diameter side of the tapered roller in the axial direction; a stationary member being relatively stationary with respect to the engaging element housing space in the axial direction; a cam mechanism for moving the working member in the axial direction to push and move the tapered roller by the pressing portion along with the retainer when the working member is relatively pivoted in a predetermined direction with respect to the stationary member; and an operating portion for pivoting the working member.

As the stationary member, a housing for rotatably sheathing the input member and the driven member through a bearing can be used.

Moreover, the clutch may include an elastic return member for storing an elastic force when the working member is relatively pivoted with respect to the stationary member and for separating the pressing portion of the working member from the engaging element when the working member is relatively pivoted in a reverse direction with respect to the stationary member.

The elastic return member can be constituted by a coil spring having one end tied to the working member and the other end tied to the stationary member. Such a coil spring may be attached to, for example, the housing serving as the stationary member so that its one end is tied to a lever portion of the working member and the other end is tied to the housing.

DETAILED DESCRIPTION OF THE PREFERRED EMBODIMENTS

Hereinafter, a clutch according to one embodiment of the present invention will be described with reference to the accompanying drawings.

Figure 1:
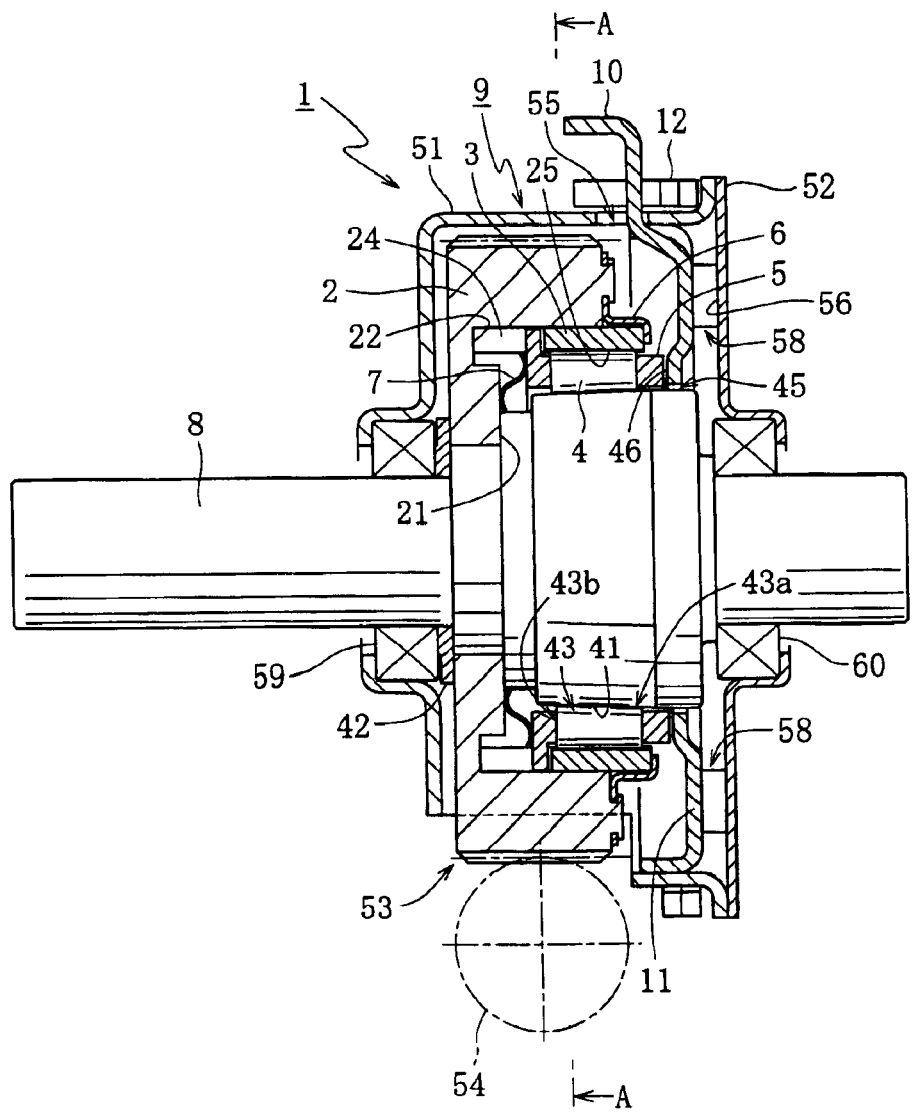
FIG. 1 is a vertical sectional side view of a clutch according to one embodiment of the present invention.

As shown in FIG. 1, a clutch 1 includes: an input gear 2 to which a rotational torque is input; a clutch member 3 attached to an inner circumferential face of the input gear 2; a tapered roller 4 acting as an engaging element; a retainer 5 for holding the tapered roller 4; a cap member 6; a waved spring 7; an output shaft 8 serving as a driven member; a housing 9 for sheathing the input gear 2; a working member 11 equipped with an operating lever 10; and a return spring 12 serving as an elastic return member, for elastically supporting the working member 11. FIG. 1 shows a state where the output shaft 8 is driven by the input gear 2 to cause its rotation.

Figure 2:
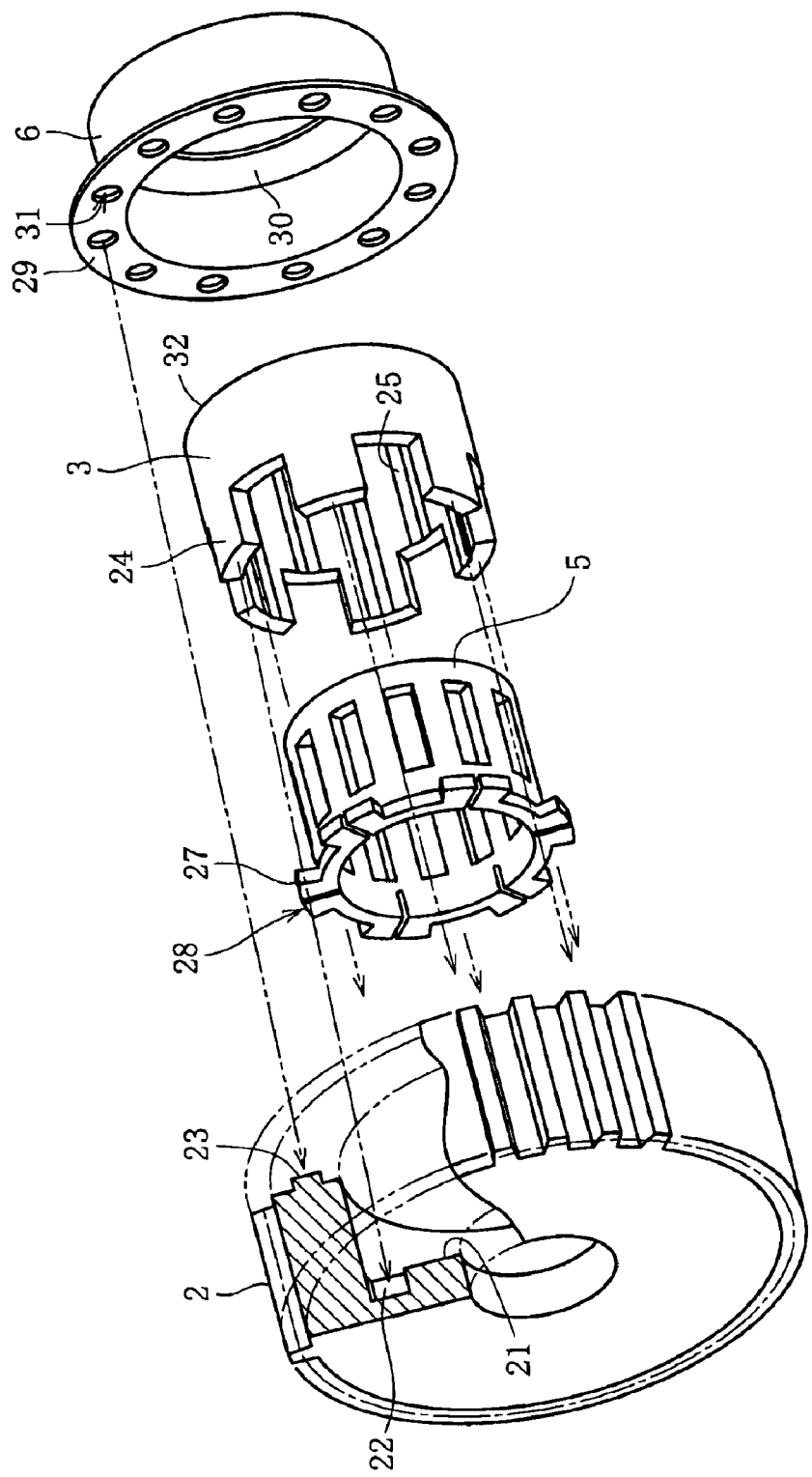
FIG. 2 is an exploded perspective view showing an input member, a clutch member, a retainer, and a cap member.

As shown in FIG. 2, the input gear 2 has teeth on its outer circumferential face. The input gear 2 has an inwardly-oriented flange portion 21 on one side in the axial direction (on the left side in FIG. 2). A concave portion 22 for engagement with the clutch member 3 in the circumferential direction is formed on the inner face of the flange portion 21 (on the side face on the right side in FIG. 2). A plurality of projections 23, to which the cap member 6 for fixing the clutch member 3 to the input gear 2 is attached, are formed at predetermined intervals on one end face of the input gear 2 (on an end face on the right in FIG. 2).

Figure 3:
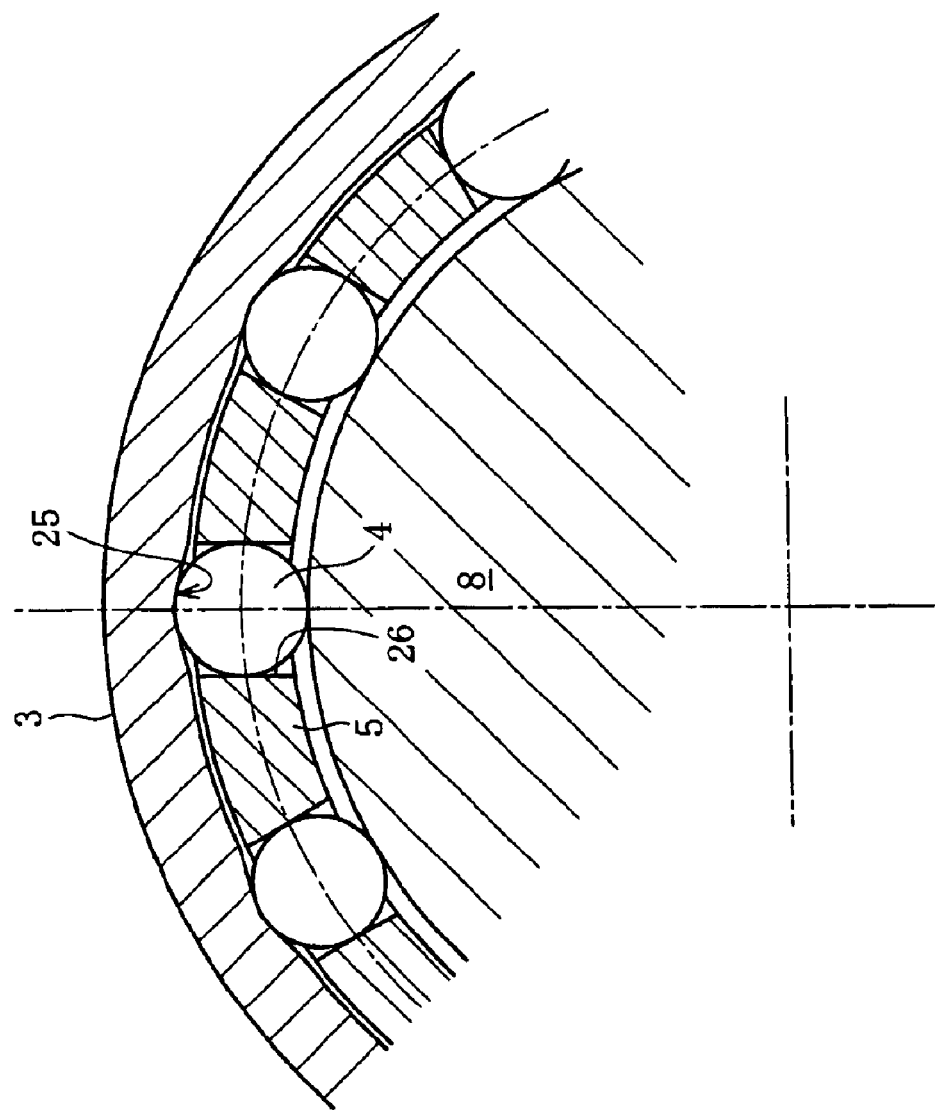
FIG. 3 is a vertical sectional view showing cam faces formed on the clutch member.

The clutch member 3 is an approximately cylindrical member having an outer diameter such that allows its attachment to the input gear 2 on its inner circumferential face. A plurality of engaging pieces 24, each extending in the axial direction, are provided at predetermined intervals in the circumferential direction on the peripheral edge portion of the clutch member 3 on its one side in the axial direction (on the peripheral edge portion on the left side in FIG. 2). Moreover, as shown in FIG. 3, a plurality of cam faces 25, with which the tapered roller 4 described below is engaged, are formed on the inner circumferential face of the clutch member 3 at predetermined intervals in the circumferential direction so as to correspond to pockets 26 of the retainer 5. Each of the cam faces 25 has such a shape that is enlarged in the middle and is gradually narrowed toward both ends in the rotational direction. This shape allows the engagement of the tapered roller 4 in either forward or reverse rotational direction.

Figure 4:
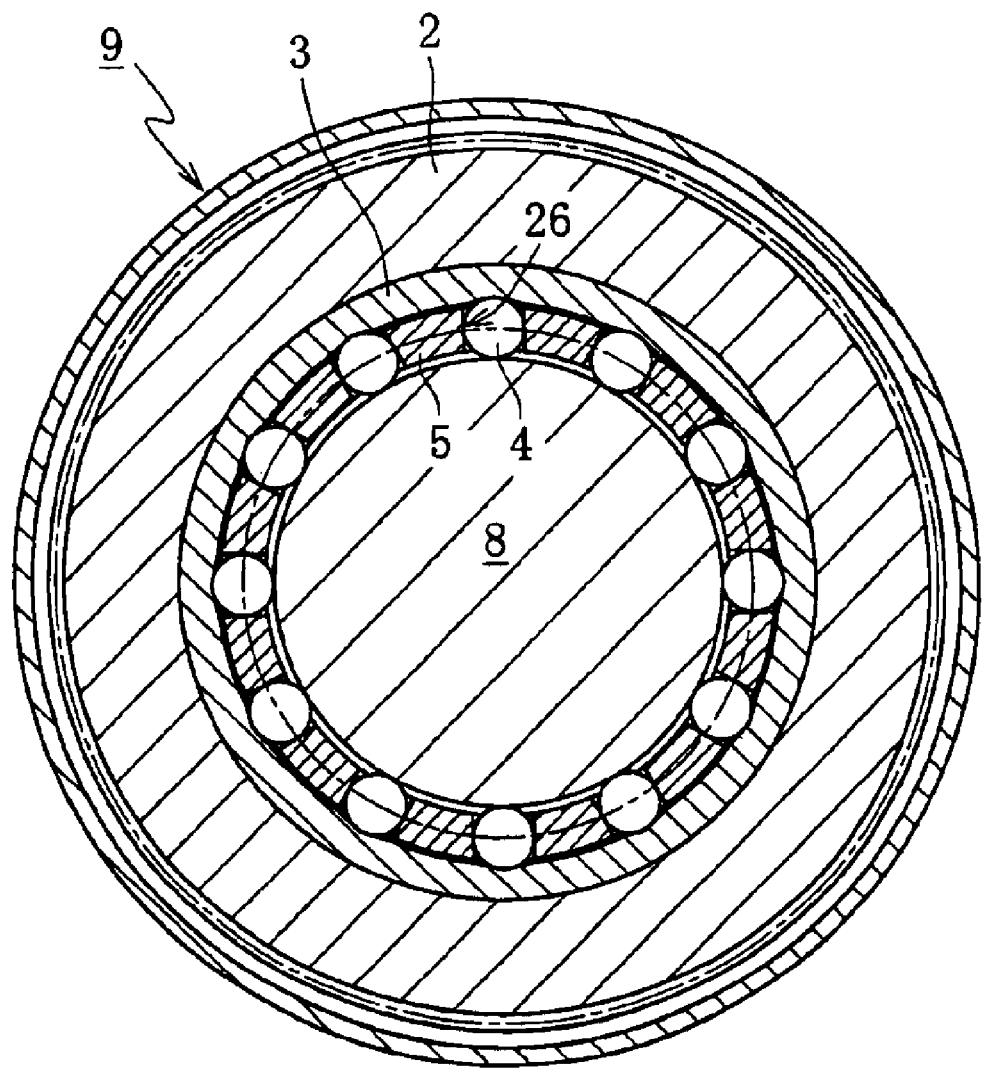
FIG. 4 is a vertical sectional view showing the arrangement of the tapered roller.

The retainer 5 is an approximately cylindrical member having such an outer diameter that allows its attachment to the clutch member 3 on its inner circumferential face. The plurality of pockets 26 for housing the tapered roller 4 therein are formed in the retainer 5 at predetermined intervals in the circumferential direction. As shown in FIG. 4, this retainer 5 has twelve pockets 26 at equal intervals in the circumferential direction. Each of the pockets 26 in the retainer 5 is capable of housing the tapered roller 4 with a gap or a small interference of 0.1 mm or less in the circumferential direction and a gap of 0.2 mm or less in the axial direction. Optionally, a projection, which projects toward inside of the pocket 26, may be provided on at least one of the outer diameter side and the inner diameter side of the pocket 26 of the retainer 5 so as to prevent the tapered roller 4 from dropping out of the pocket 26.

Furthermore, as shown in FIG. 2, the retainer 5 includes a plurality of engaging convex portions 27 projecting in the outer diameter direction, provided at predetermined intervals in the circumferential direction on its one end in the axial direction (on the left end in FIG. 2). The engaging convex portions 27 can be fitted into the respective spaces between the engaging pieces 24 of the clutch 3. The engaging convex portions 27 and the engaging pieces 24 of the clutch 3 are engaged with each other in the circumferential direction so as to fit the retainer 5 into the clutch member 3 on its inner circumferential side. Moreover, in the middle of each of the engaging convex portions 27 in its circumferential direction, a notch 28 is formed in a radial direction.

The cap member 6 serves to fix the retainer 5 and the clutch member 3 to the input gear 2. As shown in FIG. 2, the cap member 6 is an approximately cylindrical member. The cap member 6 has an outwardly-oriented flange 29, which extends in the outer diameter direction, on the peripheral edge portion on its one side (on the left side in FIG. 2) in the axial direction, whereas the cap member 6 has an inwardly-oriented flange 30, which extends in an inner diameter direction, on the peripheral edge portion on the opposite side (on the right side in FIG. 2). A plurality of holes 31 are formed through the outwardly-oriented flange 29 at predetermined intervals in the circumferential direction, on the left side in FIG. 2. The projections 23 provided on the end of the input gear 2 on the right side in FIG. 2 are fitted into the respective holes 31.

Figure 5A:
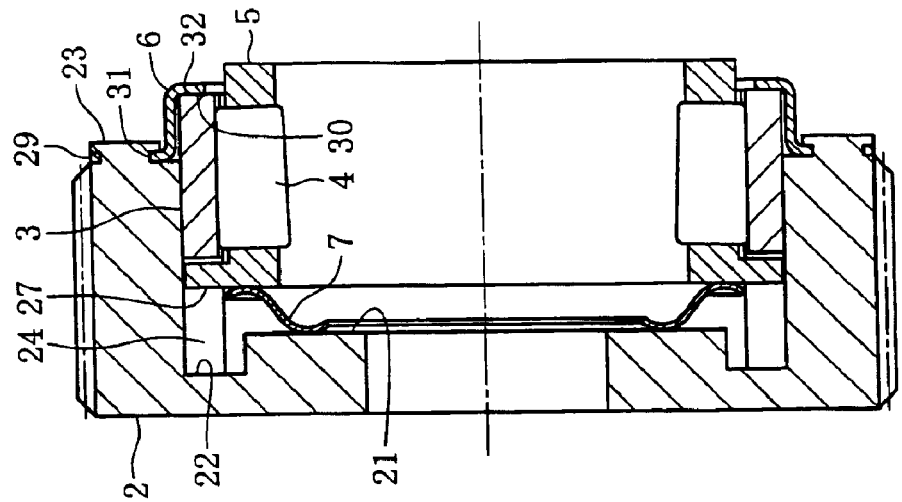
FIG. 5(a) is a vertical sectional side view showing a state before the attachment of the cap member.
Figure 5B:
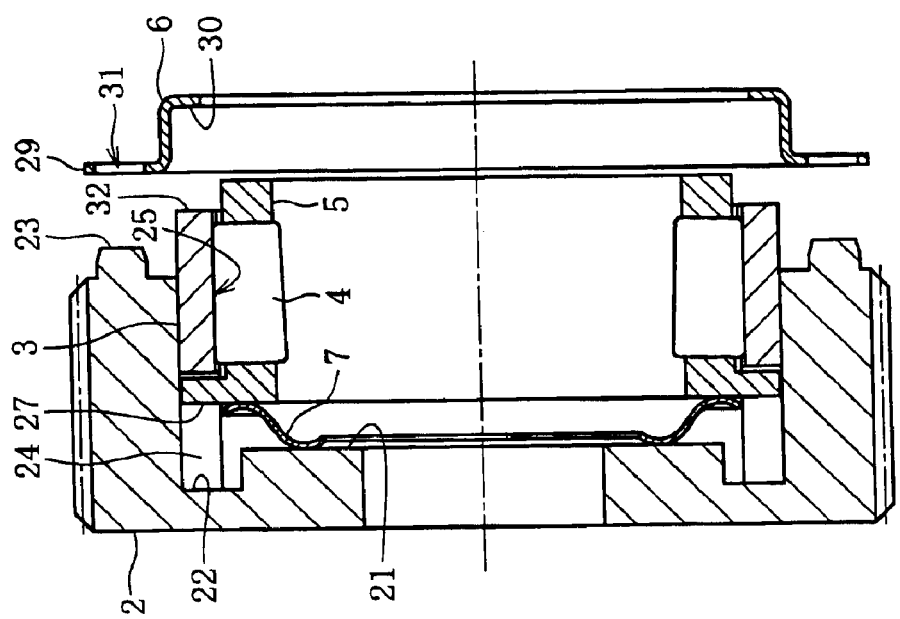
FIG. 5(b) is vertical sectional side view showing a state after the attachment of the cap member.

As shown in FIG. 2, the retainer 5 is fitted into the clutch member 3 on its inner circumferential side while the engaging pieces 24 of the clutch member 3 and the engaging convex portions 27 of the retainer 5 are being engaged with each other. As shown in FIG. 5(a), the engaging pieces 24 of the clutch member 3 are fitted into the concave portions 22 formed on the inner face of the flange portion 21 of the input gear 2 in an assembly state of the retainer 5 and the clutch member 3. The retainer 5 and the clutch member 3 are attached to the input gear 2 on its inner circumferential face. Then, the inwardly-oriented flange 30 of the cap member 6 is fitted to an axial peripheral edge portion 32 of the clutch member 3 while the projections 23 provided on the inner gear 2 are inserted into the holes 31 formed through the outwardly-oriented flange 29. Subsequently, the tips of the projections 23 of the input gear 2 are crushed as shown in FIG. 5(b) so as to fix the cap member 6 to the input gear 2. As a result, the retainer 5 and the clutch member 3 can be attached to the input gear 2.

The clutch member 3, which is fitted into the input gear 2 and is prevented from dropping out with the cap member 6 in the above described manner, has the engaging pieces 24 that are engaged with the concave portions 22 of the input gear 2 in the circumferential direction. Accordingly, the clutch member 3 rotates cooperatively with the input gear 2. Moreover, since the engaging convex portions 27 of the retainer 5 are engaged with the engaging pieces 24 of the clutch member 3 in the circumferential direction, the retainer 5 rotates cooperatively with the clutch member 3 and the input gear 2. At the same time, the retainer 5 is guided by the engaging pieces 24 of the clutch member 3 so as to be slidable in the axial direction. In this manner, the engaging pieces 24 of the clutch member 3 have the function as a guiding section, that is, the function of guiding the retainer 5 in the axial direction.

The retainer 5 is fitted into the input gear 2 while the tapered roller 4 is being attached to the retainer 5 using an attachment tool, although the attachment tool is not shown in FIG. 2. When the input gear 2, the clutch member 3, the retainer 5, and the tapered roller 4 are to be assembled, a waved spring 7 is inserted between the flange portion 21 of the input gear 2 and the engaging convex portions 27 of the retainer 5 as shown in FIGS. 5(a) and 5(b).

The output shaft 8 has a tapered portion 41 that is enlarged in the axial direction, on the outer circumferential face of its middle portion, as shown in FIG. 1. A minor diameter side of the tapered portion 41 (the left side in FIG. 1) has three steps so as to reduce its diameter in a stepwise manner.

The assembly of the input gear 2, the clutch member 3, the retainer 5, and the tapered roller 4 shown in FIG. 5(b) is attached to the output shaft 8 from the end of the tapered portion 41 on its minor diameter side. In a first step portion of the output shaft 8, the waved spring 7 is inserted. To a second step portion, the inwardly-oriented flange portion 21 of the input gear 2 is attached. The input gear 2 is movably attached to the output shaft 8 and is prevented from dropping out with a spacer 42 attached to the output shaft 8.

In this state, an engaging element housing space 43, which is gradually narrowed toward one side (the right side in FIG. 1) in the axial direction, is formed between the tapered portion 41 of the output shaft 8 and the inner circumferential face of the clutch member 3. The tapered roller 4 housed within the pockets 26 in the retainer 5 is provided in the engaging element housing space 43. A narrower side 43a of the engaging element housing space 43 serves as an engagement portion where the tapered roller 4 is capable of engaging in a wedgewise manner with the cam faces 25 of the clutch member 3. A wider side 43b of the engaging element housing space 43 serves as a disengagement portion where the wedge engagement of the tapered roller 4 in the circumferential direction is cancelled because a distance between the tapered portion 41 of the output shaft 8 and the inner circumferential face of the clutch member 3 is larger than an outer diameter of the tapered roller 4.

Figure 6:
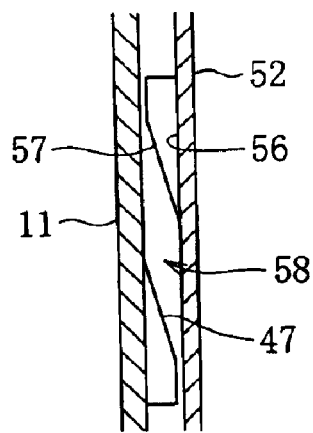
FIG. 6 is a sectional view showing a cam mechanism between a working member and a housing.

The working member 11 is an approximately disk-like shaped member having a hole 45 in its center. The output shaft 8 can be movably inserted in the hole 45. The working member 11 has the operating lever 10 extending in the outer diameter direction. The working member 11 is attached to the output shaft 8 from the end of the tapered portion 41 on its major diameter side. An end of the inner diameter of the hole 45 in the working member 11 and the vicinity thereof are bent toward the retainer 5 (toward the left side in FIG. 1) so as to function as a pressing portion 46 for pressing the retainer 5. As shown in FIG. 6, a plurality of wedge-shaped projections 47 gradually projecting in the circumferential direction (in a right-hand direction in FIG. 1 when the working member 11 is seen from the left end side of the output shaft 8) are formed at predetermined intervals in the circumferential direction on the opposite face of the working member 11 (the face that does not face the retainer 5).

The housing 9 is constituted by a cover member 51 and a lid member 52. The cover member 51 sheathes the clutch portion constituted by the input gear 2 and the like. The lid member 52 seals an open end of the cover member 51. An opening 53, through which the tooth of the input gear 2 is externally exposed, is provided on the lower portion of the cover member 51. Through this opening 53, the input gear 2 can be connected to, for example, a worm gear 54 attached to a driving shaft of a driving device (motor) of a sliding door. Moreover, another opening 55 is formed at the top of the cover member 51 of the housing 9 in the circumferential direction. Through this opening 55, the operating lever 10 of the working member 11 extends to the exterior of the housing 9, which allows the pivoting operation of the operating lever 10.

The lid member 52 of the housing 9 is attached from the major diameter side of the tapered portion 41 of the output shaft 8 while its inner face 56 is being opposed to the working member 11. On the inner face 56 of the lid member 52, as shown in FIG. 6, a plurality of wedge-shaped projections 57 gradually projecting in a direction opposite to the projecting direction of the wedge-shaped projections 47 of the working member 11 (in a left-hand direction in FIG. 1 when the lid member 52 is seen from the left end side of the output shaft 8) are formed so as to mate with the wedge-shaped projections 47 of the working member 11. The wedge-shaped projections 57 formed on the lid member 52 of the housing 9 and the wedge-shaped projections 47 formed on the working member 11 constitute a pair of cam mechanisms 58 for moving the working member 11 in the axial direction (to the left side in FIG. 1).

The cover member 51 and the lid member 52 of the housing 9 are, as shown in FIG. 1, respectively attached to the output shaft 8 through bearings 59 and 60, and then are tied by tying means such as jointing by burring.

The above-described clutch member 3, the working member 11, the cover member 51, and the lid member 52 of the housing 9 can be fabricated at low cost by, for example, cold pressing.

Figure 7:
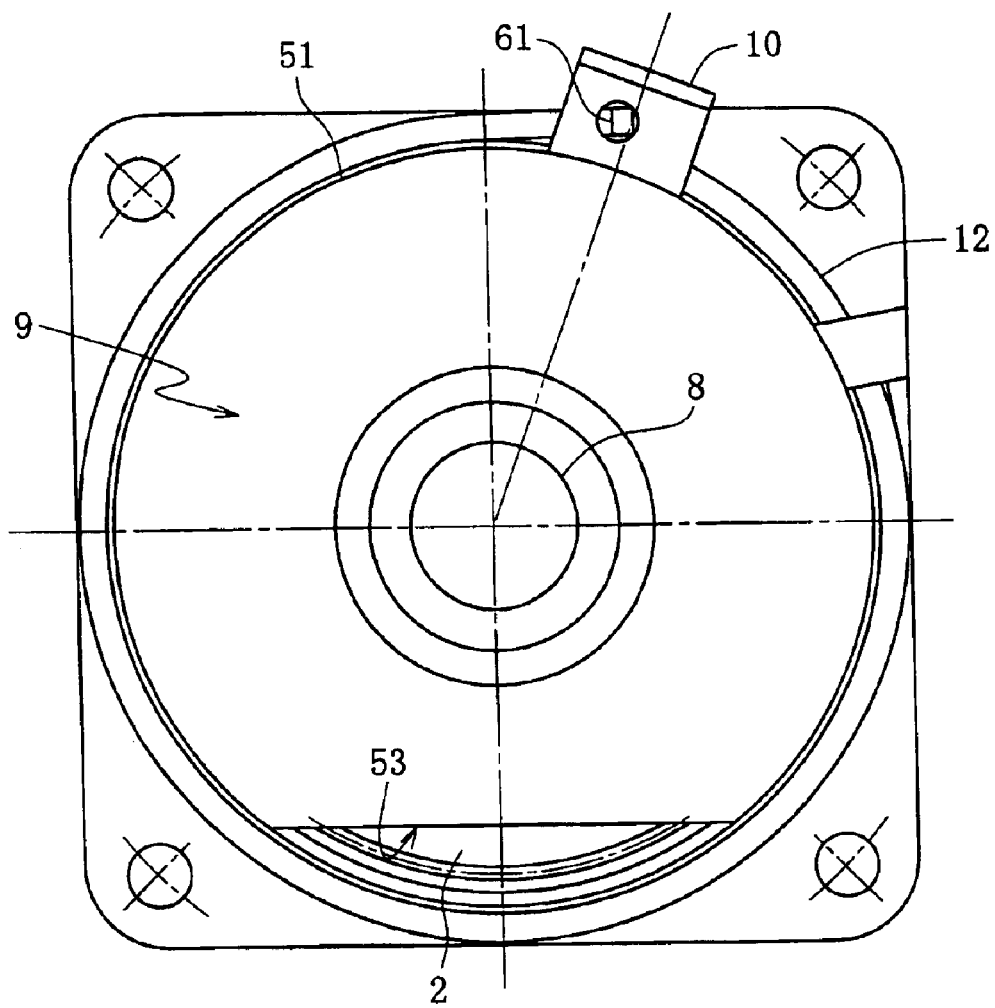
FIG. 7 is a diagrammatic view showing the position of an operating lever in a driven state.

The return spring 12 is constituted by, for example, a coil spring attached around the outer circumference of the cover member 51 of the housing 9 as shown in FIGS. 1 and 7. Although not shown in the drawings, one end of the return spring 12 is fixed to the housing 9 while the other end 61 is attached to the operating lever 10 of the working member 11 so that the operating lever 10 pivots and is positioned on the right side when the cover member 51 of the housing 9 is seen from the left end side of the output shaft 8. The return spring 12 has the function as an elastic return member for pivoting the operating lever 10 in the right-hand direction.

The clutch 1 is constituted as described above. As shown in FIG. 7, the operating lever 10 of the working member 11 is normally positioned on the right side by the function of the return spring 12. As shown in FIG. 7, since the wedge-shaped projections 47 of the working member 11 and the wedge-shaped projections 57 of the lid member 52 do not mate with each other in this state, the retainer 5 is elastically energized toward the narrower side 43*a* of the engaging element housing space 43 by the waved spring 7 as shown in FIG. 1. The tapered roller 4 is pushed into the narrower side 43*a* of the engaging element housing space 43 along with the retainer 5. Since the gap in the radial direction between the output shaft 8 and the clutch member 3 is narrowed when the retainer 5 is positioned on the narrower side 43*a* of the engaging element housing space 43, the tapered roller 4 is engaged in a wedgewise manner with the cam faces 25 provided on the clutch member 3 in the circumferential direction when a rotational torque is input to the input gear 2. As a result, the rotational torque is transmitted from the input gear 2 to the output shaft 8 so as to drive and rotate the output shaft 8 in both forward and reverse directions with respect to the input gear 2. Moreover, in the case where the rotational torque is reversely input to the output shaft 8, the rotational torque is reversely input from the output shaft 8 to the input gear 2 because the tapered roller 4 is engaged in a wedgewise manner with the cam faces 25 provided on the clutch member 3 in the circumferential direction.

At this time, the retainer 5 is subjected to a large force in the circumferential direction through the tapered roller 4. However, since the elastic deformation of the retainer 5 in the circumferential direction is allowed owing to the presence of the notches 28 formed in the engaging convex portions 27 of the retainer 5 (see FIG. 2), the retainer 5 can be prevented from being damaged.

Figure 8:
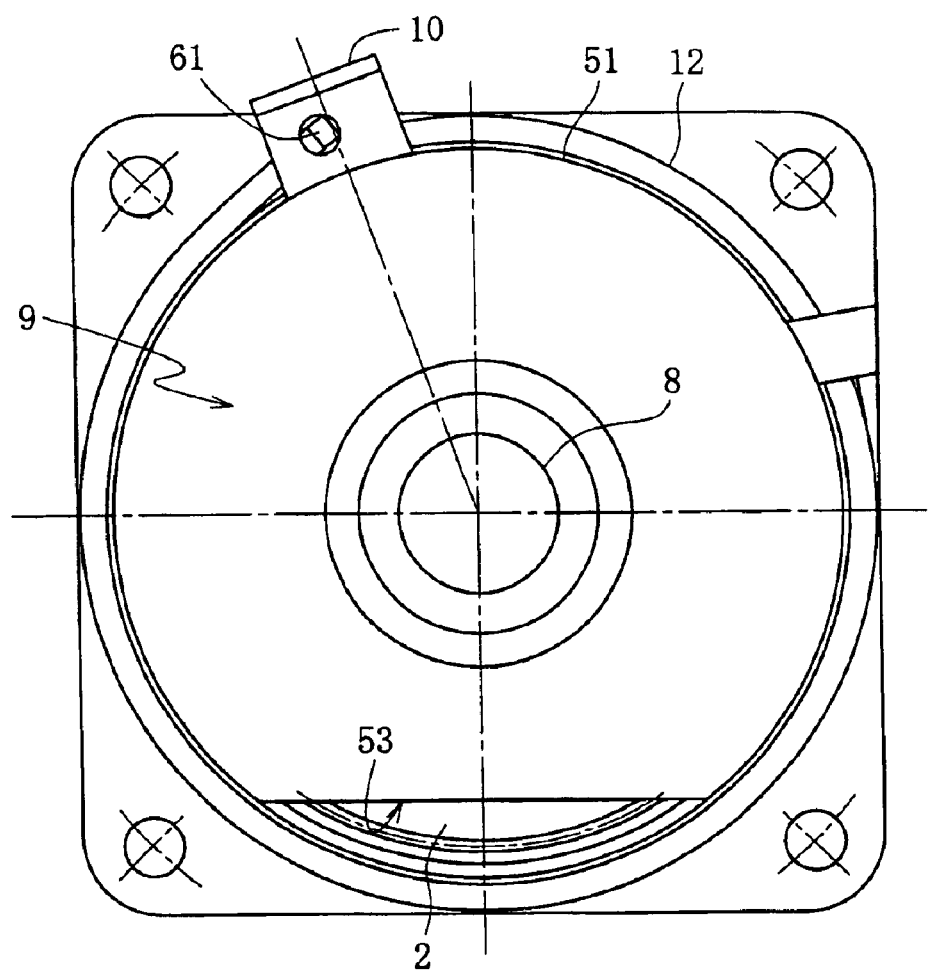
FIG. 8 is a diagrammatic view showing the position of the operating lever in a free rotation state.

The clutch 1 can be switched to a state where the wedge engagement of the tapered roller 4 is cancelled to allow the free rotation of the output shaft 8 by pivoting the operating lever 10 of the working member 11 to the left, as shown in FIG. 8.

Figure 9:
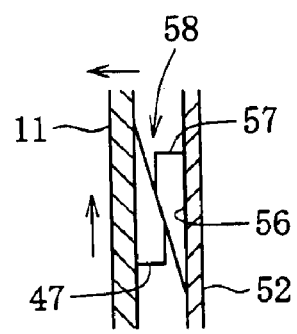
FIG. 9 is a sectional view showing a state where the cam mechanism between the working member and the housing are engaged with each other in a free rotation state.
Figure 10:
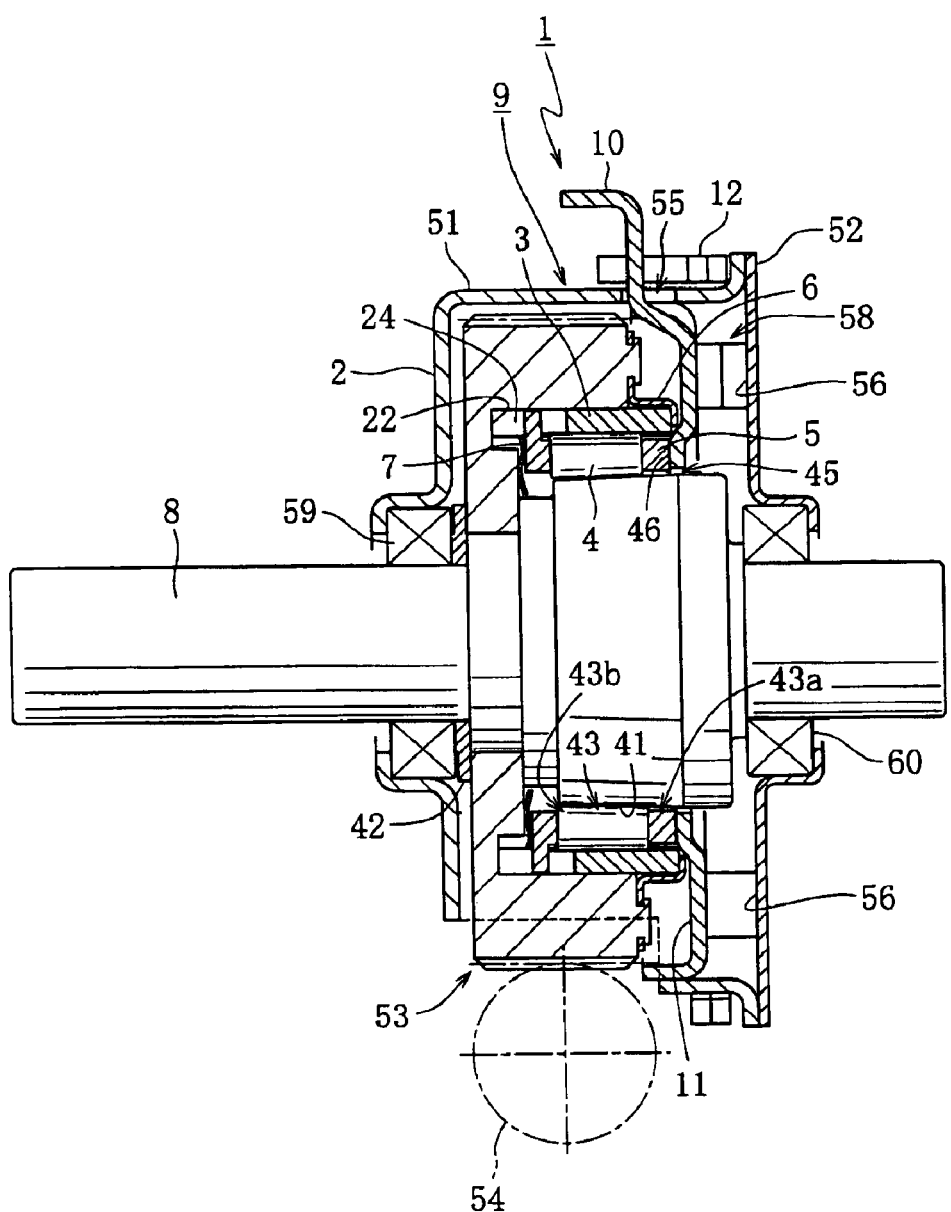
FIG. 10 is a vertical sectional side view showing a free rotation state of the clutch according to one embodiment of the present invention.

More specifically, the operating lever 10 is pivoted to the position where the wedge-shaped projections 47 of the working member 11 and the wedge-shaped projections 57 of the lid member 52 of the housing 9 mate with each other, as shown in FIG. 9. As a result, the wedge-shaped projections 47 of the working member 11 come on the wedge-shaped projections 57 of the lid member 52 of the housing 9 so as to move the working member 11 to the left in the axial direction. The retainer 5 is pushed out toward the larger side of the engaging element housing space 43 against the elastic force of the waved spring 7 by the pressing portion 46 of the working member 11. As a result, the tapered roller 4 moves toward the larger side of the engaging element housing space 43 along with the retainer 5. Since the gap between the output shaft 8 and the clutch member 3 is large when the retainer 5 moves toward the larger side of the engaging element housing space 43, the wedge engagement of the tapered roller 4 with the cam faces 25 provided for the clutch member 3 in the circumferential direction is cancelled. When a rotational torque is input to the input gear 2 at this time, the tapered roller 4 rotates along with the retainer 5, the clutch member 3, and the input gear 2. However, since the gap between the output shaft 8 and the clutch member 3 is large, the tapered roller 4 is not engaged with the cam faces 25 of the clutch member 3 in a wedgewise manner. Thus, the rotational torque is not transmitted to the output shaft 8. As a result, since the rotational torque is not transmitted from the input gear 2 to the output shaft 8, the output shaft 8 is not driven to rotate with respect to the input gear 2. Moreover, if the rotational torque is reversely input to the output shaft 8 in this state, any rotational torque is not transmitted to the input gear 2 because the function as a clutch is lost. As a result, the output shaft 8 can be freely rotated with respect to the input gear 2.

When the operating lever 10 is pivoted to the right as shown in FIG. 8, the return spring 12 is compressed to store the elastic compressive force. The switching of the output shaft 8 from the free rotation state to the driven rotation state is achieved by pivoting the operating lever 10 to the right. More specifically, when the operating lever 10 is slightly pivoted to the right so as to cancel the engagement between the wedge-shaped projections 47 of the working member 11 and the wedge-shaped projections 57 of the lid member 52 of the housing 9, the operating lever 10 automatically pivots to the right to return to its original position owing to the elastic restoring force of the return spring 12. As a result, the output shaft 8 is switched from the free rotation state to the driven rotation state.

The clutch 1 can be applied to a mechanism for switching an electrically-operated sliding door between an automatic opening/closing state and a manual opening/closing state by, for example, connecting the input gear 2 to the worm gear 54 attached to a driving shaft of a driving device (motor) of the sliding door and connecting the output shaft 8 to a driving mechanism of the sliding door, not shown.

According to the clutch 1, with a simple operation of pivoting the operating lever 10, the sliding door can be switched between the automatic opening/closing operation and the manual opening/closing operation of the sliding door. Moreover, since the clutch 1 has a mechanical clutch structure using the wedge engagement of the tapered roller 4, the clutch 1 according to the present invention can be reduced in size, weight and cost as compared with an electromagnetic clutch. Furthermore, since the clutch 1 according to the present invention is not required to be always electrically conducted, the clutch is also advantageous in terms of power saving.

Furthermore, the clutch member 3, with which the tapered roller 4 is engaged in a wedgewise manner in the circumferential direction, is independently provided. Therefore, the cam faces 25 can be easily formed, resulting in low-cost fabrication.

In addition, the elastic deformation of the retainer 5 in the circumferential direction is allowed by the presence of the notches 28 formed in the engaging convex portions 27 of the retainer 5 (see FIG. 2). As a result, even if a large force is applied to the retainer 5 in the circumferential direction when a rotational torque is transmitted, the retainer 5 can be prevented from being damaged.

Furthermore, the engaging convex portions 27 of the retainer 5 are engaged with the engaging pieces 24 of the clutch member 3 in the circumferential direction to guide the retainer 5 in the axial direction. Accordingly, the retainer 5 can be moved straight in the axial direction to inhibit the skew of the tapered roller 4. As a result, an unexpected load can be prevented from being applied to the retainer 5.

Therefore, even if a large rotational torque is applied, any inconveniences can be prevented from being caused.

Although one embodiment of the clutch according to the present invention has been described above, the clutch according to the present invention is not limited to the above-described embodiment.

The engaging element housing space may be provided so that any one of or both of an inner diameter of an outer ring (clutch member), with which the engaging element is engaged in a wedgewise manner in the circumferential direction, and an outer diameter of an inner ring (output shaft) is/are tapered in the axial direction. For example, in the above-described embodiment, the tapered portion is provided for the output shaft, and the clutch member provided with the cam faces is attached to the input gear so as to provide the engaging element housing space. Alternatively, the clutch member provided with the cam faces is attached to the output shaft so that the inner circumferential face of the input gear is narrowed in the axial direction on one side and enlarged toward the opposite side to provide the engaging element housing space.

As the cam face, with which the tapered roller is engaged in a wedgewise manner in the circumferential direction, the cam face, which is deep in the middle and becomes gradually shallower from the middle toward both ends in the rotation direction so that the tapered roller is engaged in a wedgewise manner in any of forward and reverse directions, has been exemplified above. However, a cam face having such a shape that becomes gradually shallower toward on the side of the forward rotation direction in the rotation direction and is deep on the side in the opposite direction can be used so that the wedge engagement is not achieved in the case of reverse rotation. According to such a cam face, a so-called one-way clutch can be constituted; that is, even if the tapered roller is moved toward the narrower side of the engaging element housing space, a forward rotational torque is transmitted from the input gear to the output shaft although a reverse rotational torque is not transmitted.

Although the tapered roller has been exemplified as an engaging element in the above-described embodiment, the clutch according to the present invention is not limited thereto. Various engaging elements, which can be engaged in a wedgewise manner in the circumferential direction, can be used between an input member and a driven member.

What is claimed is:

1. A clutch comprising: an input member to which a rotational torque is input:

a driven member; and an engaging element enabling wedge engagement in a circumferential direction between the input member and the driven member, the engaging element being provided in an engaging element housing space formed between the input member and the driven member, wherein the rotational torque is transmitted from the input member to the driven member when the engaging element is engaged in a wedgewise manner in the circumferential direction between the input member and the driven member, and an engagement portion where the engaging element enables the wedge engagement is provided on one side of the engaging element housing space in an axial direction, whereas a disengagement portion where the wedge engagement of the engaging element is cancelled is provided on the opposite side, and operation means for moving the engaging element in the axial direction between the engagement portion and the disengagement portion is provided, wherein the engaging element is a tapered roller, and a retainer for holding the tapered roller is provided between the input member and the driven member so as to be movable in the axial direction, and the engaging element housing space is formed between the input member and the driven member so as to be narrowed on one side in the axial direction and to be gradually enlarged toward the opposite side, and the engagement portion where the tapered roller is engageable in the circumferential direction is provided on the narrower side of the engaging element housing space whereas the disengagement portion where the wedge engagement of the tapered roller is cancelled is provided on the larger side, wherein the tapered roller is provided so that a minor diameter end of the tapered roller is oriented toward the narrower side of the engaging element housing space while the operation means moves the tapered roller forward and backward in the axial direction along with the retainer, and wherein the retainer has a notch for allowing elastic deformation of the retainer in the circumferential direction on its one end.

2. A clutch comprising:

an input member to which a rotational torque is input;

a driven member; and an engaging element enabling wedge engagement in a circumferential direction between the input member and the driven member, the engaging element being provided in an engaging element housing space formed between the input member and the driven member, wherein the rotational torque is transmitted from the input member to the driven member when the engaging element is engaged in a wedgewise manner in the circumferential direction between the input member and the driven member, and an engagement portion where the engaging element enables the wedge engagement is provided on one side of the engaging element housing space in an axial direction, whereas a disengagement portion where the wedge engagement of the engaging element is cancelled is provided on the opposite side, and operation means for moving the engaging element in the axial direction between the engagement portion and the disengagement portion is provided, wherein the engaging element is a tapered roller, and a retainer for holding the tapered roller is provided between the input member and the driven member so as to be movable in the axial direction, and the engaging element housing space is formed between the input member and the driven member so as to be narrowed on one side in the axial direction and to be gradually enlarged toward the opposite side, and the engagement portion where the tapered roller is engageable in the circumferential direction is provided on the narrower side of the engaging element housing space whereas the disengagement portion where the wedge engagement of the tapered roller is cancelled is provided on the larger side, wherein the tapered roller is provided so that a minor diameter end of the tapered roller is oriented toward the narrower side of the engaging element housing space while the operation means moves the tapered roller forward and backward in the axial direction along with the retainer, and wherein a clutch member engaged with any one of the input member and the driven member in the circumferential direction is provided, and a cam face, with which the tapered roller is engaged in a wedgewise manner in the circumferential direction, is provided for the clutch member.

3. The clutch according to claim 2, wherein a guiding portion for guiding the retainer in the axial direction is provided for the clutch member.

4. The clutch according to any one of claims 1 to 3, wherein the operation means includes: elastic energizing means for energizing the tapered roller toward the narrower side of the engaging element housing space along with the retainer; and disengaging means for moving the tapered roller toward the larger side of the engaging element housing space along with the retainer against the elastic energizing means so as to cancel the wedge engagement state of the tapered roller.

5. The clutch according to claim 4, wherein the elastic energizing means is constituted, on the larger side of the engaging element housing space, by a spring member inserted between an inwardly-oriented or outwardly-oriented flange provided for any one of the input member and the driven member, and one end of the retainer.

6. The clutch according to claim 4, wherein the disengaging means includes:

a working member having a pressing portion provided so as to be opposed to a peripheral edge portion of the retainer on a minor diameter side of the tapered roller in the axial direction;

a stationary member being relatively stationary with respect to the engaging element housing space in the axial direction;

a cam mechanism for moving the working member in the axial direction to push and move the tapered roller by the pressing portion along with the retainer when the working member is relatively pivoted in a predetermined direction with respect to the stationary member; and an operating portion for pivoting the working member.

7. The clutch according to claim 6, wherein the stationary member is a housing for rotatably sheathing the input member and the driven member through a bearing.

8. The clutch according to claim 6, further comprising an elastic return member for storing an elastic force when the working member is relatively pivoted with respect to the stationary member and for separating the pressing portion of the working member from the engaging element when the working member is relatively pivoted in a reverse direction with respect to the stationary member.

9. The clutch according to claim 8, wherein the elastic return member is constituted by a coil spring having one end tied to the working member and the other end tied to the stationary member.

* * * * *